United States Patent
Chowdhury et al.

(10) Patent No.: US 12,499,167 B2
(45) Date of Patent: Dec. 16, 2025

(54) ITEM RETRIEVAL USING GENERATIVE MODEL OUTPUT

(71) Applicant: eBay Inc., San Jose, CA (US)

(72) Inventors: Nazmul Kabir Chowdhury, Nyack, NY (US); Jonathan Frank Galsurkar, New York, NY (US); Jeffrey C. Kahn, Jr., Bristol, PA (US); Hua Gong, Kenmore, WA (US); Sathishkumar Veeraraghavan, San Ramon, CA (US); Yuri Michael Brovman, Miami, FL (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/597,076

(22) Filed: Mar. 6, 2024

(65) Prior Publication Data
US 2025/0284748 A1  Sep. 11, 2025

(51) Int. Cl.
*G06F 16/00* (2019.01)
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC ... G06F 16/9535; G06F 16/9538; G06F 16/00
See application file for complete search history.

(56) References Cited

U.S. PATENT DOCUMENTS

| | | | |
|---|---|---|---|
| 11,698,921 B2 | 7/2023 | Liu | |
| 2011/0179024 A1* | 7/2011 | Stiver | G06F 16/338 |
| | | | 715/810 |
| 2018/0052913 A1 | 2/2018 | Gaskill et al. | |

(Continued)

FOREIGN PATENT DOCUMENTS

JP   2023-129333 A   9/2023

OTHER PUBLICATIONS

Brew et al., "The Basics of Vector Space Models For SEO", Available online at : <https://marketbrew.ai/a/vector-space-models-seo>, pp. 1-38.

(Continued)

*Primary Examiner* — Cheryl Lewis
(74) *Attorney, Agent, or Firm* — Shook Hardy & Bacon L.L.P.

(57) ABSTRACT

Some aspects relate to technologies for leveraging model output from a generative model to perform item retrieval on a listing platform. In some examples, input for item retrieval is provided to a generative model to produce a model output. A lookup is performed on a key-value store using the model output. If a matching query is found in the key-value store, a query embedding corresponding to the matching query is returned. If a matching query is not found, a query embedding is obtained by generating the query embedding from the model output or using the model output to query a known query index for a known query, which is used to lookup a query embedding in the key-value store. One or more item embeddings are identified based on the query embedding. An output is provided identifying one or more item listings corresponding to the one or more item embeddings.

20 Claims, 6 Drawing Sheets

(56) References Cited

U.S. PATENT DOCUMENTS

| | | | |
|---|---|---|---|
| 2020/0311146 A1 | 10/2020 | Guo et al. | |
| 2023/0316006 A1 | 10/2023 | Tunstall-Pedoe et al. | |
| 2024/0020321 A1 | 1/2024 | Mosenia et al. | |
| 2024/0256615 A1* | 8/2024 | Liu | G06F 16/954 |
| 2024/0256757 A1* | 8/2024 | Manavoglu | G06F 16/954 |
| 2024/0265106 A1* | 8/2024 | Mehta | G06F 21/57 |
| 2024/0403373 A1* | 12/2024 | Chao | G06F 16/9538 |

OTHER PUBLICATIONS

Brovman et al., "Building a Deep Learning Based Retrieval System for Personalized Recommendations", Deep Learning in Engineering, Mar. 1, 2022. 8 pages.

Brovman et al., "Optimizing Similar Item Recommendations in a Semi-structured Marketplace to Maximize Conversion", RecSys '16: Proceedings of the 10th ACM Conference on Recommender Systems, Sep. 7, 2016, pp. 199-202.

EBay: "How eBay overhauled its similarity algorithms for blistering speed", The Stack, May 16, 2023. pp. 1-8.

Lo et al., "Page-level Optimization of e-Commerce Item Recommendations", RecSys '21: Proceedings of the 15th ACM Conference on Recommender Systems, Sep. 13, 2021, 16 pages.

Pan et al., "Evolving Recommendations: A Personalized User-Based Ranking Model", Machine Learning in Engineering, Oct. 3, 2023. 9 pages.

Rajput et al., "Recommender Systems with Generative Retrieval", Available at : <arXiv:2305.05065v3 [cs.IR] Nov. 3, 2023>, Nov. 3, 2023. 17 pages.

Subramonyam et al., "Bridging the Gulf of Envisioning: Cognitive Design Challenges in LLM Interfaces", Available at: <arXiv:2309.14459v1 [cs.HC] Sep. 25, 2023>, Sep. 25, 2023. pp. 1-27.

Tao et al., "Enhancing Search Using Language Models", Whatnot Engineering, Sep. 28, 2023. pp. 1-13.

Wang et al., "Rethinking E-Commerce Search", Available at: <arXiv:2312.03217v1 [cs.IR] Dec. 6, 2023>, Dec. 6, 2023. pp. 1-19.

Xue et al., "How eBay Created a Language Model With Three Billion Item Titles", Advertising in Engineering, Jan. 9, 2023. 8 pages.

Yu et al., "Enhancing E-Commerce Product Search Using LLMs", Towards AI, Aug. 10, 2023. pp. 1-14.

Extended European Search Report received for European Patent Application No. 25161623.1, mailed on Jun. 18, 2025, 14 pages.

Henzinger et al., "Private Web Search with Tiptoe", SOSP '23: 29th Symposium on Operating Systems Principles, Oct. 23, 2023, pp. 396-416.

Magnani et al., "Semantic Retrieval at Walmart", KDD '22: Proceedings of the 28th ACM SIGKDD Conference on Knowledge Discovery and Data Mining, Aug. 14, 2022, pp. 3495-3503.

Zhang et al., "Towards Personalized and Semantic Retrieval: An End-to-End Solution for E-commerce Search via Embedding Learning", SIGIR '20: Proceedings of the 43rd International ACM SIGIR Conference on Research and Development in Information Retrieval, Jul. 25, 2020, pp. 2407-2416.

* cited by examiner

ITEM RETRIEVAL USING GENERATIVE MODEL OUTPUT

BACKGROUND

Listing platforms, such as e-commerce websites, are online platforms that offer products, services, digital content (e.g., music, videos, etc.), or other items to users. Such platforms typically offer a vast number of items. While some items are relevant to any given user, the majority is not. As a result, item retrieval for listing platforms is a particular Internet-centric problem that has proven to be difficult to fully address. That is, given a large number of items available on a listing platform, what items should be retrieved and presented to a user and in what order.

Given the vast number of items available, listing platforms include functionality, such as search and recommendation, to assist users in finding items of interest on the platforms. For instance, listing platforms often provide search capabilities that receive user queries and return search results identifying items relevant to the user queries. Listing platforms also often leverage recommendation systems to recommend items that are likely of interest to users based on a variety of information, such as an item currently being viewed by a user, user attributes, and user behavior on the listing platforms (e.g., previous item views, purchases, etc.).

SUMMARY

Some aspects of the present technology relate to, among other things, performing item retrieval on a listing platform using model output from a generative model. In some examples, input for item retrieval is received, for instance, based on a user query or a seed item for recommendation. The input is provided to a generative model, which generates text to produce a model output. A lookup is performed on a key-value store using the model output. The key-value store stores queries as keys and query embeddings as corresponding values. If a query matching the model output is identified in the key-value store, the query embedding stored in association with that matching query is retrieved. In some aspects, if a matching query for the model output is not found in the key-value store, a known query index is searched using the model output to identify a known query relevant to the model output, and a query embedding is retrieved from the key-value store by performing a lookup using the known query. In some aspects, if a matching query for the model output is not found in the key-value store, a query embedding is generated by providing the model output to an embedding model.

After obtaining one or more query embeddings, one or more item embeddings are identified based on similarity to the query embedding(s). Each item embedding corresponds to an item listing on the listing platform. An output is provided that identifies the item listing(s) corresponding to the item embedding(s). For instance, search results identifying item listings can be provided as a response to a user query, or item listings could be provided as recommendations.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

While item retrieval systems are useful tools for locating items on listing platforms, shortcomings in existing search and recommendation technologies used by conventional item retrieval systems often result in the consumption of an unnecessary quantity of computing resources (e.g., I/O costs, network packet generation costs, throughput, memory consumption, etc.). For instance, current search systems often fall short in allowing users to efficiently find items of interest. This could be a result of limited query understanding by the search engine. Search systems typically operate on keyword-based queries and may not fully understand some queries, such as complicated natural language queries submitted by some users. While some search systems provide filtering functions to filter search results, the available filters can be insufficient or not intuitive. In the context of recommendations, the recommend items provided by the recommendation system are often too similar or too diverse to seed items, and there is no way to adjust the distance of the recommended items to the seed items. While some recommendation systems personalize recommended items for users, such personalization is not available in many situations, such as when a user navigates to an item page from a third-party search engine. Furthermore, item listings on listing platforms often include unstructured data, increasing the difficulty for item retrieval systems to return relevant item listings for both search and recommendation.

As a result of shortcomings in existing search and recommendation technologies on listing platforms, users often have to submit multiple queries before finding desired item listings. For example, a user may issue a first query to a search engine of a listing platform that returns a set of search results. The user may browse the search results and select certain search results to access the corresponding item listings. Selection of search results causes retrieval of the corresponding item listings. Additionally, in some cases, applications are launched in order to render data associated with the item listings. In the context of recommendation, when recommended item listings are insufficient, users may select to view certain item listings and discover the listings are not what the user is seeking. This often results in the users turning to query-based searching, which can involve issuing numerous queries in an attempt to identify relevant item listings as discussed above.

These repetitive inputs result in increased computing resource consumption, among other things. For instance, repetitive user queries result in packet generation costs that adversely affect computer network communications. Each time a user issues a query, the contents or payload of the query is typically supplemented with header information or other metadata within a packet in TCP/IP and other protocol networks. Accordingly, when this functionality is multiplied by all the inputs needed to obtain the desired data, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if users repetitively issue queries, it is expensive because processing queries consumes a lot of computing resources. For example, for some item retrieval systems, a query execution plan may need to be calculated each time a query is issued, which could require a system to find the least expensive query execution plan to fully execute the query. This decreases throughput and increases network latency, and can waste valuable time.

Aspects of the technology described herein improve the functioning of the computer itself in light of these shortcomings in existing search and recommendation technologies by providing a solution in which an item retrieval system leverages model output from a generative model to facilitate returning item listings for search and recommendation applications on a listing platform.

In accordance with some configurations, the item retrieval system receives input for item retrieval. The input could be based on, for instance, a user query in the case of search or a seed item in the case of recommendation. The input is provided to a generative model, which generates a text string as model output. In some cases, the model output identifies one or more global items, each of which name an item (e.g., iphone 15). In some cases, the model output includes one or more item descriptions (e.g., 4 k 55 inch OLED TV).

The item retrieval system uses the model output to identify relevant item listings on the listing platform to return as search results or recommendations. In particular, the item retrieval system obtains a query embedding for the model output and identifies item embeddings based on similarity to the query embedding. To reduce latency and operate at scale on a listing platform, query embeddings and item embeddings are generated offline by an embedding model. Query embeddings can be generated, for instance, for historical queries in a query log for the listing platform and/or model output previously generated by the generative model based on various inputs previously received by the system. A key-value store stores queries (e.g., historical queries or previously-generated model output) as keys with query embeddings as corresponding values. The item embeddings are generated for item listings available on the listing platform and can be stored in an item embedding data store in conjunction with item listing identifiers identifying the corresponding item listings.

At runtime, to obtain a query embedding for a given model output, a lookup is performed on the key-value store using the model output. If a query matching the model output (i.e., a matching query) is identified in the key-value store, the query embedding stored as a value with that matching query is retrieved. If a matching query is not found in the key-value store, a query embedding for the model output can be obtained in a number of different ways. In some aspects, a known query index is searched to identify one or more known queries relevant to the model output. Known queries are queries for which a query embedding has been generated and stored in the key-value store. The known query index could be searched, for instance, using fuzzy search, to identify a known query that is relevant to the model output, while not being an exact (or near-exact) match to the model output. A known query identified from the search is used to perform a lookup on the key-value store to retrieve the query embedding stored with that known query. In further aspects, when a matching query for the model output is not found in the key-value store, a query embedding is generated at runtime by providing the model output to an embedding model.

A query embedding obtained for the model output is used to identify similar item embeddings. This could involve vector search techniques, such as cosine similarity and k-nearest neighbor. An output is generated based on the identified item embeddings. For instance, item listing identifiers associated with the identified item embeddings can be used to generate search results or recommendations identifying item listings identified by those item listing identifiers. In some instances, a similarity measure determined for each item embedding (i.e., indicative of an extent of similarity of the item embedding to the query embedding) can be used to order the search results or recommendations.

Aspects of the technology described herein provide a number of improvements over existing item retrieval technologies. For instance, computing resource consumption is improved relative to existing technologies. In particular, a generative model is used to generate text that can be better matched to item listings on a listing platform relative to an initial input, such as a user query or a seed item. For instance, the model output can comprise text identifying a global product or a product description that is used to identify more relevant item listings as search results or recommendations. Use of query embeddings for model output and item embeddings for item listings further improves the relevance of search results and recommendations. Moreover, offline generation of query embeddings and item embeddings reduces latency and allows for item retrieval at scale on large listing platforms.

The relevance of item listings returned using aspects of the technology described herein eliminates (or at least reduces) the repetitive user queries, search result selections, and rendering of item listings relative to conventional techniques because relevant item listings are provided without the need for users to continuously input various search queries to access search results and/or continuously make item selections to obtain further information around presented item listings. Accordingly, aspects of the technology described herein decrease computing resource consumption, such as packet generation costs. For instance, a user query (e.g., an HTTP request), would only need to traverse a computer network once (or fewer times relative to existing technologies). Specifically, the contents or payload of the user query is supplemented with header information or other metadata within a packet in TCP/IP and other protocol networks once for the initial user query. Such packet for a user query is only sent over the network once or fewer times. Thus, there is no repetitive generation of metadata and continuous sending of packets over a computer network.

In like manner, aspects of the technology described herein improve storage device or disk I/O and query execution functionality, as they only need to go out to disk a single time (or fewer times relative to existing search technologies). As described above, the inadequacy of existing search and recommendation technologies results in repetitive user queries, search result selections, and item listing renderings. This causes multiple traversals to disk. In contrast, aspects described herein reduce storage device I/O because the user provides only minimal inputs and so the computing system does not have to reach out to the storage device as often to perform a read or write operation. For example, the system can leverage model output from a generative model to identify item listings that satisfy user intent from a single user query (or few queries relative to existing technology) and/or single round of providing recommendations. Accordingly, there is not as much wear on components, such as a read/write head, because disk I/O is substantially reduced.

Example System for Item Retrieval Using Generative Model Output

Figure 1:
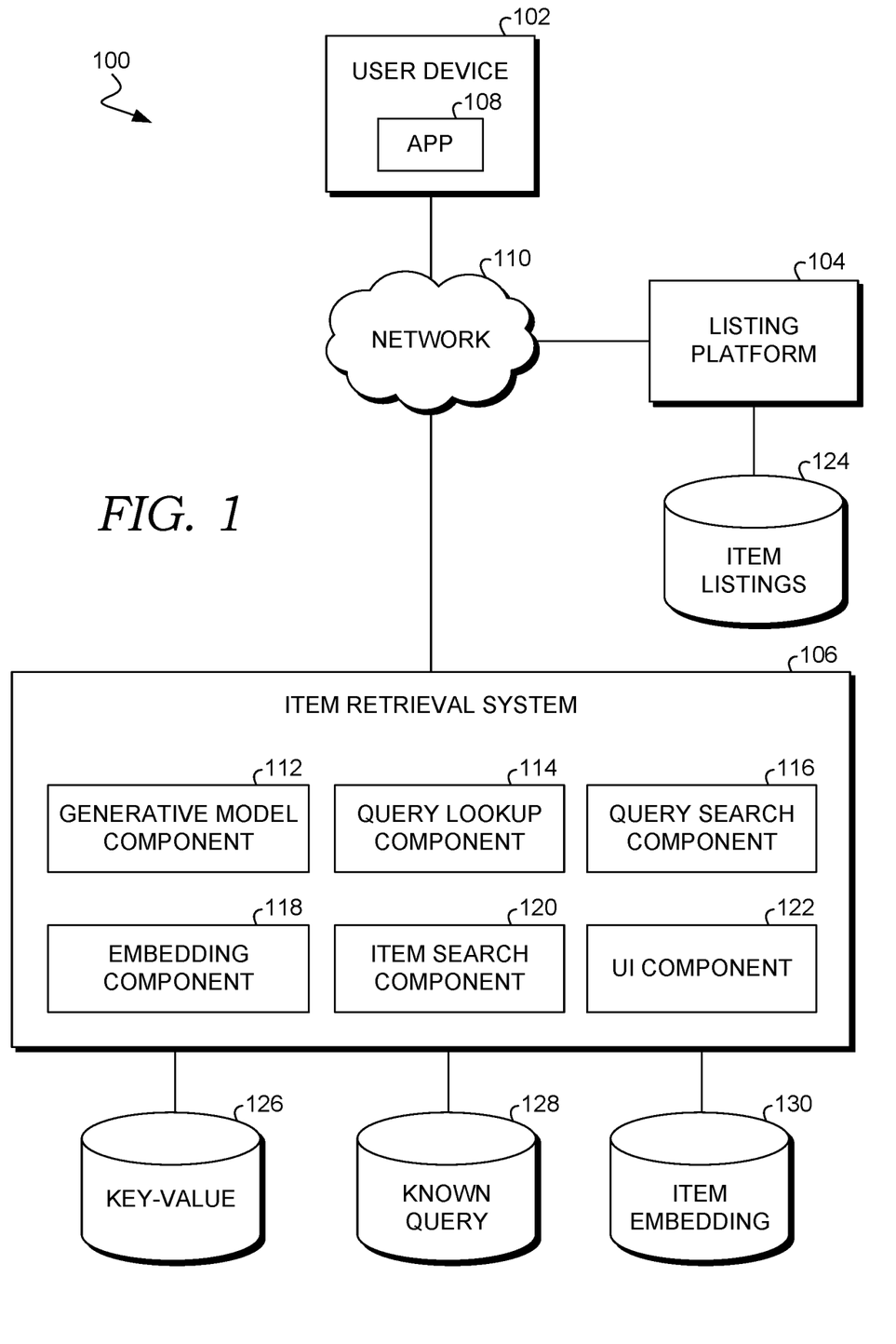
FIG. 1 is a block diagram illustrating an exemplary system in accordance with some implementations of the present disclosure.

With reference now to the drawings, FIG. 1 is a block diagram illustrating an exemplary system 100 for performing item retrieval on a listing platform by leveraging generative model output in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102, a listing platform 104, and an item retrieval system 106. Each of the user device 102, the listing platform 104, and the item retrieval system 106 shown in FIG. 1 can comprise one or more computer devices, such as the computing device 600 of FIG. 6, discussed below. As shown in FIG. 1, the user device 102, the listing platform 104, and the item retrieval system 106 can communicate via a network 110, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the listing platform 104 and the item retrieval system 106 could each be provided by multiple server devices collectively providing the functionality of the listing platform 104 and the item retrieval system 106 as described herein. Additionally, other components not shown may also be included within the network environment.

The user device 102 can be a client device on the client-side of operating environment 100, while the listing platform 104 and the item retrieval system 106 can be on the server-side of operating environment 100. The listing platform 104 and/or the item retrieval system 106 can each comprise server-side software designed to work in conjunction with client-side software on the user device 102 so as to implement any combination of the features and functionalities discussed in the present disclosure. For instance, the user device 102 can include an application 108 for interacting with the listing platform 104 and/or the item retrieval system 106. The application 108 can be, for instance, a web browser or a dedicated application for providing functions, such as those described herein. This division of operating environment 100 is provided to illustrate one example of a suitable environment, and there is no requirement for each implementation that any combination of the listing platform 104 and the item retrieval system 106 remain as separate entities. For instance, in some aspects, the item retrieval system 106 is a part of the listing platform 104. While the operating environment 100 illustrates a configuration in a networked environment with a separate user device, listing platform, and item retrieval system, it should be understood that other configurations can be employed in which aspects of the various components are combined.

The user device 102 may comprise any type of computing device capable of use by a user. For example, in one aspect, a user device may be the type of computing device 600 described in relation to FIG. 6 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user may be associated with the user device 102 and may interact with the listing platform 104 and/or the item retrieval system 106 via the user device 102.

The listing platform 104 can be implemented using one or more server devices, one or more platforms with corresponding application programming interfaces, cloud infrastructure, and the like. The listing platform 104 generally provides, to user devices such as the user device 102, item listings describing items (physical or digital) available for purchase, rent, streaming, download, etc. For instance, the listing platform 104 could comprise an e-commerce platform, in which listed products or services are available for purchase by users of the user device 102 upon navigation to the listing platform 104. As other examples, the listing platform 104 could comprise a rental platform listing various items for rent (e.g., equipment, tools, real estate, vehicles, contract employees) or a media platform listing digital content items (e.g., digital content for streaming/download).

The functionality of the listing platform 104 includes provision of interfaces enabling surfacing of item listings for items to users of the listing platform 104. Item listings for items available for sale/rent/consumption via the listing platform 104 are stored by the item listings data store 124.

Each item listing may include a description relating to an item comprising one or more of a price in a currency, reviews, images of the item, shipment options, a rating, a condition of the item, a size of the item, a color of the item, etc. In aspects, each item is associated with one or more categories including meta-categories and leaf categories. For example, the meta-categories are each divisible into subcategories (or branch categories), whereas leaf categories are not divisible.

The item retrieval system 106 leverages a generative model when performing item retrieval (e.g., search and recommendation) for the listing platform. As shown in FIG. 1, the item retrieval system 106 includes a generative model component 112, a query lookup component 114, a query search component 116, an embedding component 118, an item search component 120, and a user interface component 122. The components of the item retrieval system 106 may be in addition to other components that provide further additional functions beyond the features described herein. The item retrieval system 106 can be implemented using one or more server devices, one or more platforms with corresponding application programming interfaces, cloud infrastructure, and the like. While the item retrieval system 106 is shown separate from the listing platform 104 and the user device 102 in the configuration of FIG. 1, it should be understood that in other configurations, some of the functions of the item retrieval system 106 can be provided on the listing platform 104 and/or the user device 102. Additionally, while the components 112, 114, 116, 118, 120, 122 are shown as part of the item retrieval system 106, in other configurations, one or more of the components can be provided by the listing platform 104 or another location not shown in FIG. 1. The components can be provided by a single entity or multiple entities.

In some aspects, the functions performed by components of the item retrieval system 106 are associated with one or more applications, services, or routines. In particular, such applications, services, or routines may operate on one or more user devices, servers, may be distributed across one or more user devices and servers, or be implemented in the cloud. Moreover, in some aspects, these components of the item retrieval system 106 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

Based on interactions between a user device, such as the user device 102, and the listing platform 104, an input for item retrieval is received by the item retrieval system 106. In the case of search, a user could submit a user query to perform a search for items on the listing platform 104. For instance, the user could submit, via the application 108 on the user device 102, a text-based or voice-based user query, and input is provided to the item retrieval system 106 based on the user query. In the case of recommendation, input based on a seed item (or multiple seed items) could be received by the item retrieval system 106. For instance, a user could select to view a listing page for an item, and to access recommendations to include on the listing page, input could be received identifying the item, such as an item title or an item description. In some aspects, the input could be supplemented with additional information, such as, for instance, user information for the current user interacting with the listing platform 104 (e.g., attributes or behavior information regarding the user), chat history from a current or previous chat session for the user, and information for other users.

Given an input for item retrieval, the generative model component 112 of the item retrieval system 106 uses a generative model to generate an output for use in querying available item listings on the listing platform. The model output comprises a text string generated by the generative model. In some cases, the text string identifies a "global product" or a "global item" which is a real world entity like an iPhone 15 or any other product that has a UPC number of ISBN number, for example. The text string can identify the global product by name without identifying any particular item listing from the listing platform. The model output for a given input can identify a single global item or multiple global items. In further aspects, instead of identifying a global item by name or other identifier, the text string output by the generative model can comprise an item description that provides attributes of an item. For instance, an item description of "4 k 55 inch OLED TV" includes attributes specifying a resolution, screen size, and screen type for a television.

In some aspects, the generative model component 112 generates a prompt using the input received for item retrieval and provides the prompt to the generative model to generate the model output. The prompt can comprise a text string instructing the generative model regarding how to generate the text for the model output. The prompt used for a given input can be based on the type of item retrieval (e.g., search or recommendation) being performed. For instance, the prompt could comprise a text string such as "find related items to [seed item from input]" in the recommendation scenario. As another example, the prompt could comprise a text string such as "pretend you are an expert recommendation system, find the best items for this user query" in the search scenario.

In some cases, the prompt can be generated based on supplemental information (e.g., user information) associated with the input. For instance, suppose the user submits a user query "show me shirts that I can wear to my event on Friday night". In that case, the system can retrieve supplemental information, such as user attributes (e.g., "gender: male", "age: 35", and "size: medium") and information regarding the type of event on Friday night based on the user's calendar. That supplemental information could then be used to generate a prompt to cause the generative model to generate an appropriate output.

The generative model used by the generative model component 112 to provide output for performing item retrieval can comprise a language model that includes a set of statistical or probabilistic functions to perform Natural Language Processing (NLP) in order to understand, learn, and/or generate human natural language content. For example, a language model can be a tool that determines the probability of a given sequence of words occurring in a sentence or natural language sequence. Simply put, it can be a model that is trained to predict the next word in a sentence. A language model is called a large language model (LLM) when it is trained on enormous amount of data and/or has a large number of parameters. Some examples of LLMs are GOOGLE's BERT and OpenAI's GPT-3 and GPT-4. These models have capabilities ranging from writing a simple essay to generating complex computer codes-all with limited to no supervision. Accordingly, an LLM can comprise a deep neural network that is very large (billions to hundreds of billions of parameters) and understands, processes, and produces human natural language by being trained on massive amounts of text. These models can predict future words in a sentence letting them generate sentences similar to how humans talk and write.

In accordance with some aspects, the generative model used by the generative model component 112 comprises a neural network. As used herein, a neural network comprises multiple operational layers, including an input layer and an output layer, as well as any number of hidden layers between the input layer and the output layer. Each layer comprises neurons. Different types of layers and networks connect neurons in different ways. Neurons have weights, an activation function that defines the output of the neuron given an input (including the weights), and an output. The weights are the adjustable parameters that cause a network to produce a correct output.

In some configurations, the generative model used by the generative model component 112 is a pre-trained model (e.g., GPT-4) that has not been fined-tuned. In other configurations, the generative model is a model that is built and trained from scratch or a pre-trained model that has been fine-tuned. In such configurations, the generative model can be trained or fine-tuned using training data. For instance, the training data can comprise pairs of data in which an input is paired with a ground truth output to train the generative model to generate output text that targets the ground truth output. During training, weights associated with each neuron can be updated. Originally, the generative model can comprise random weight values or pre-trained weight values that are adjusted during training. In one aspect, the generative model is trained using backpropagation. The backpropagation process comprises a forward pass, a loss function, a backward pass, and a weight update. This process is repeated using the training data. For instance, each iteration could include providing an input text string to the model, generating an output text string by the generative model, comparing (e.g., computing a loss) the output text string from the generative model with a ground truth output text string paired with the input text string, and updating the model based on the comparison. The goal is to update the weights of each neuron (or other model component) to cause the generative model to produce particular forms of output, such as text identifying global items or providing item descriptions. Once trained, the weight associated with a given neuron can remain fixed. The other data passing between neurons can change in response to a given input. Retraining the network with additional training data can update one or more weights in one or more neurons.

Given a model output from the generative model component 112, the query lookup component 114 attempts to find a query embedding for the model output by performing a lookup in a key-value store 126. The key-value store 126 is a data store that maps known queries stored as keys to corresponding query embeddings stored as values. A known query refers to a text-string query for which a query embedding has been generated. Each query embedding in the key-value store 126 is a vector representation of a corresponding known query generated by the embedding component 118, as will be described in further detail below. For a given model output from the generative model component 112, the query lookup component 114 performs a lookup using the model output to determine if there is a matching query stored in the key-value store 126. In some aspects, a matching query is a known query having a text string that is an exact match of the text string of the model output from the generative model component 112. If there is a match, the query lookup component 114 retrieves a query embedding stored as a value in association with the matching query in the key-value store 126.

The query search component 116 performs a search on a known query index 128 using a model output from the generative model component 112 to identify a known query (or multiple known queries) relevant to the model output, although not an exact match to the model output. As previously indicated, a known query is a query for which a query embedding has been generated by the embedding component 118 and stored in the key-value store 126. The query search component 116 is employed in some configurations in which a matching query for a model output is not found in the key-value store 126. In such configurations, when a matching query is not found in the key-value store 126, the query search component 116 queries the known query index 128 based on the model output to identify one or more known queries relevant to the model output. Any of a variety of search techniques and architectures could be employed by the query search component 116 and the known query index 128. By way of example only and not limitation, the query search component 116 and the known query index 128 can comprise an Elasticsearch platform using fuzzy matching to identify one or more known queries in the known query index 126 relevant to a model output.

The embedding component 118 employs one or more embedding models to generate query embeddings for queries and item embeddings for item listings available on the listing platform 104. In some aspects, the same embedding model is used to generate both query embeddings and item embeddings, although in other configurations, separate embedding models can be used.

An embedding model comprises a machine learning model, such as a neural network, that transforms input data into a vector representation, referred to herein as an embedding, in an embedding space (sometimes referred to as a latent vector space). The embedding space of the embedding model provides a multi-dimensional space in which the similarity between embeddings can be determined, for instance, based on a geometric distance between embeddings in the embedding space. As such, a query embedding generated by an embedding model comprises a vector representation for a query in the embedding space of the embedding model, and an item embedding generated by an embedding model comprises a vector representation for an item listing in the embedding space of the embedding model. The embeddings generated by the embedding component 118 allow for the similarity between query embeddings and item embeddings to be determined for item retrieval purposes, as will be described in further detail below.

In some aspects, the embedding component 118 generates query embeddings for queries offline (i.e., not at runtime when processing an input for item retrieval). For instance, the embedding component 118 can access a query log for the listing platform 104 that stores historical queries submitted by users for searching item listings on the listing platform 104 and generate query embeddings for those historical queries. Each of those query embeddings is then stored in the key-value store 126 in association with the corresponding query from which it was generated (each query being stored as a key in the key-value store 126). Each query for which a query embedding is generated can also be indexed as a known query in the known query index 128. In some instances, the embedding component 118 accesses model output generated by the generative model component 112 for which matching queries were not present in the key-value store 126 (e.g., from a log of model output) and generates query embeddings for the model output. Each of those query embeddings is then stored in the key-value store 126 in association with the corresponding model output from which it was generated (each model output being stored as a key in the key-value store 126). Each model output for which a query embedding is generated can also be indexed as a known query in the known query index 128.

While the embedding component 118 can generate query embeddings offline in some aspects, in other configurations, the embedding component 118 can generate a query embedding for a model output at runtime. For instance, when a matching query for a model output is not found in the key-value store 126 by the query lookup component 114, the model output can be provided to the embedding component 118 to generate a query embedding for the model output, and that query embedding can be used for item retrieval in lieu of searching the known query index 128 for similar known queries. In some instances, the model output and the query embedding generated by the embedding component 118 at runtime can be added to the key-value store 126, and the model output can be indexed as a known query in the known query index 128.

For item embeddings, the embedding component 118 can take as input any of a variety of data available for each item listing available on the listing platform 104. For instance, textual data from an item listing, such as an item title and item description, can be provided as input to an embedding model to generate the item embedding for the item listing. In some aspects, a multi-modal embedding model can be used that takes as input, for instance, images of items in addition to text for the items. Item embeddings generated by embedding component 118 can be stored in an item embedding data store 130, which is used for item retrieval purposes, as will be discussed below. Each item embedding can be stored with an item listing identifier that identifies a corresponding item listing.

In accordance with various aspects, the embedding component 118 can use embedding models that are pre-trained, built from scratch, or fine-tuned from pre-trained models. In some aspects, when the same embedding model is used for both query embeddings and item embedding, the embedding model can be a neural network that is trained or fine-tuned using a contrastive learning approach in which training data comprises pairs of queries and item listings. A given pair in the training data could be a positive sample (i.e., the item listing is relevant to the query) or a negative sample (i.e., the item listing is not relevant to the query). During training, a loss function (e.g., a contrastive loss function or a triplet loss function) could be used to cause the embedding model to locate embeddings for positive samples closer in the embedding space while separating embeddings for negative samples in the embedding space.

Given a query embedding identified for a model output, the item search component 120 identifies item listings using item embeddings for item listings on the listing platform 104 stored in the item embedding data store 130. In the case in which the initial input for item retrieval is a user query, the item search component 120 identifies item listings to return as search results in response to the user query. In the case in which the initial input for item retrieval is a seed item for recommendation, the item search component 120 identifies item listings to provide as recommendations.

In some aspects, the item search component 120 determines a similarity measure between a given query embedding and item embeddings in the item embedding data store 130. A variety of techniques for determining similarity, such as cosine similarity and k-nearest neighbors, can be used. The item retrieval component 120 selects one or more item embeddings based on the similarity. An item listing identifier stored in association with each selected item embedding in the item embedding data store 130 can be retrieved and used to identify the corresponding item listings for generating search results or recommendations for responding to the initial input for item retrieval. In some instances, the search results or recommendations returned are ordered at least in part based on each item embedding's similarity to the query embedding (e.g., based on a similarity measure).

The user interface component 122 provides one or more user interfaces for interacting with the listing platform 104 and/or the item retrieval service 106. While shown as part of the item retrieval service 106 in FIG. 1, in some configurations, the user interface component 122 can be part of the listing platform 104. The user interface component 122 provides one or more user interfaces to a user device, such as the user device 102. In some instances, the user interfaces can be presented on the user device 102 via the application 108, which can be a web browser or a dedicated application for interacting with the listing platform 104 and/or the recommendation service. For instance, the user interface component 122 can provide user interfaces for, among other things, providing search results and/or recommendations identifying item listings selected by the item retrieval system 106.

Figure 2:
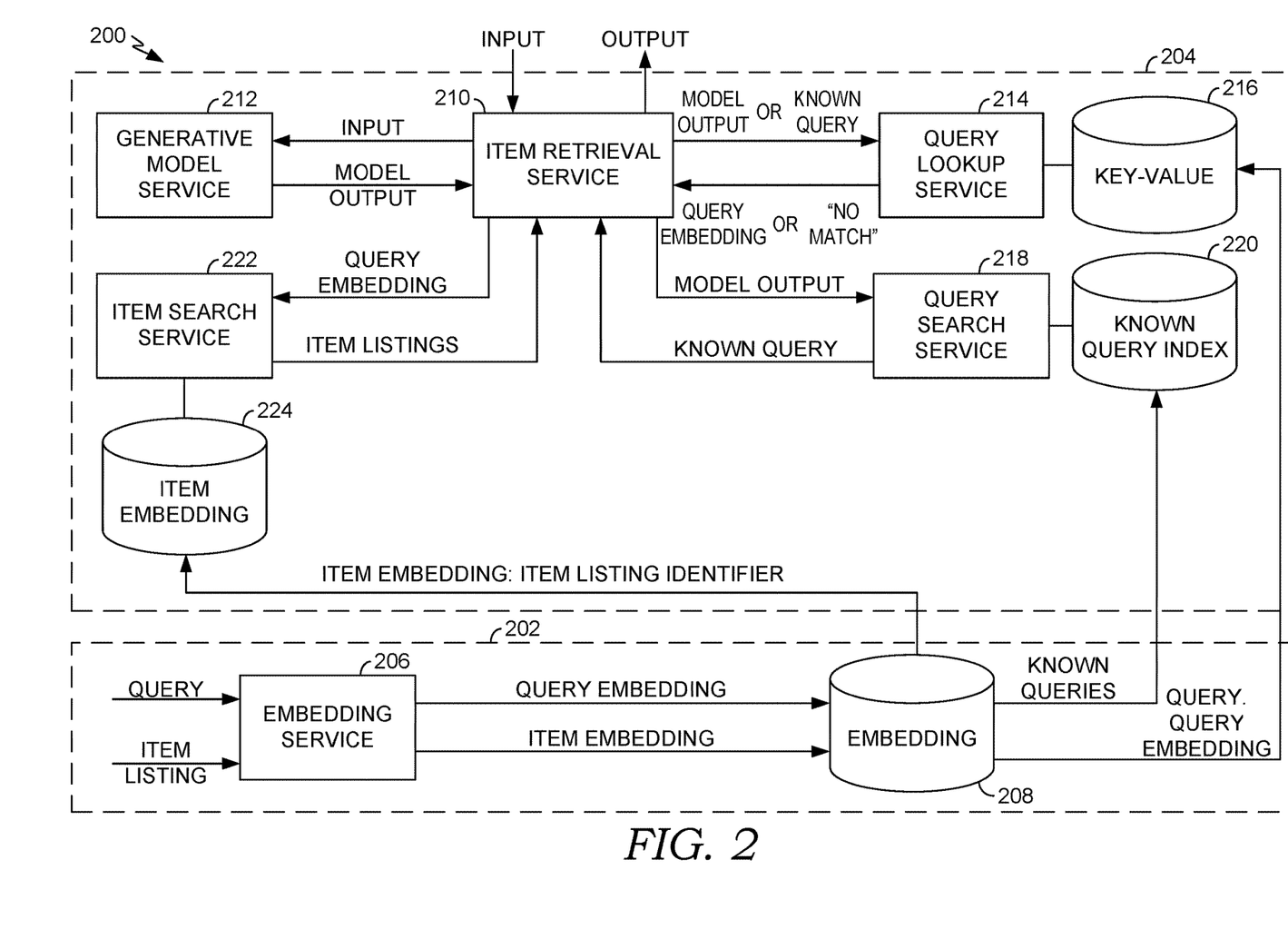
FIG. 2 is a block diagram showing an example process for performing item retrieval for a listing platform using model output from a generative model in accordance with some implementations of the present disclosure.

FIG. 2 provides a block diagram showing a process 200 for performing item retrieval using a generative model in accordance with one aspect of the present technology. The process 200 includes both an offline flow 202 and a runtime flow 204. As shown in FIG. 2, the offline flow 202 includes an embedding service 206 generating query embeddings and item embeddings, which are stored in an offline embedding data store 208. The queries from which the query embeddings are generated can comprise, for instance, historical queries from a query log and/or previous model output. The item embeddings are generated for item listings on a listing platform. Queries with corresponding query embeddings are stored in a key-value store 216 as key-value pairs, while the queries are also indexed as known queries in a known query index 220. Additionally, item embeddings are stored in association with item listing identifiers in an item embedding data store 224.

At runtime 204, an initial input, such as a user query in the case of search or a seed item in the case of recommendation, is received at an item retrieval service 210. The item retrieval service 210 can be provided, for instance, by the item retrieval system 106 of FIG. 1. In accordance with the example of FIG. 2, the item retrieval service 210 coordinates the runtime process of a number of services to perform item retrieval.

The item retrieval service 210 provides the input to a generative model service 212, which can correspond to the generative model component 112 of FIG. 1. The generative model service 212 employs a generative model to generate text based on the input to produce a model output. In some cases, this includes generating a prompt with the input and providing the prompt to the generative model. The model output is returned to the item retrieval service 210, which provides the model output to a query lookup service 214, which can correspond to the query lookup component 114 of FIG. 1. The query lookup service 214 determines whether a matching query is present in the key-value store 216. If a matching query is found in the key-value store 216, a query embedding stored in association with the matching query is returned to the item retrieval service 210.

If a matching query is not found in the key-value store 216, a no-match indication is returned to the item retrieval service 210, and the item retrieval service 210 then provides the model output to a query search service 218, which can correspond to the query search component 116 of FIG. 1. The query search service 218 searches the known query index 220 using the model output to identify a known query and returns the known query to the item retrieval service 210. The known query is provided to the query lookup service 214, which performs a lookup on the key-value store 216 using the known query to identify a corresponding query embedding and returns the query embedding to the item retrieval service 210.

The item retrieval service 210 provides the query embedding to an item search service 222, which can correspond to the item search component 120 of FIG. 1. The item search service 222 searches the item embedding store 224 to identify item embeddings similar to the query embedding, for instance, using vector search techniques. An indication of item listings (e.g., using item listing identifiers) corresponding to identified item embeddings is returned to the item retrieval service 210. The item retrieval service 210 provides an output identifying the item listings. In the case of search, the output can be used to provide search results. In the case of recommendation, the output can be used to provide item listing recommendations.

Figure 3:
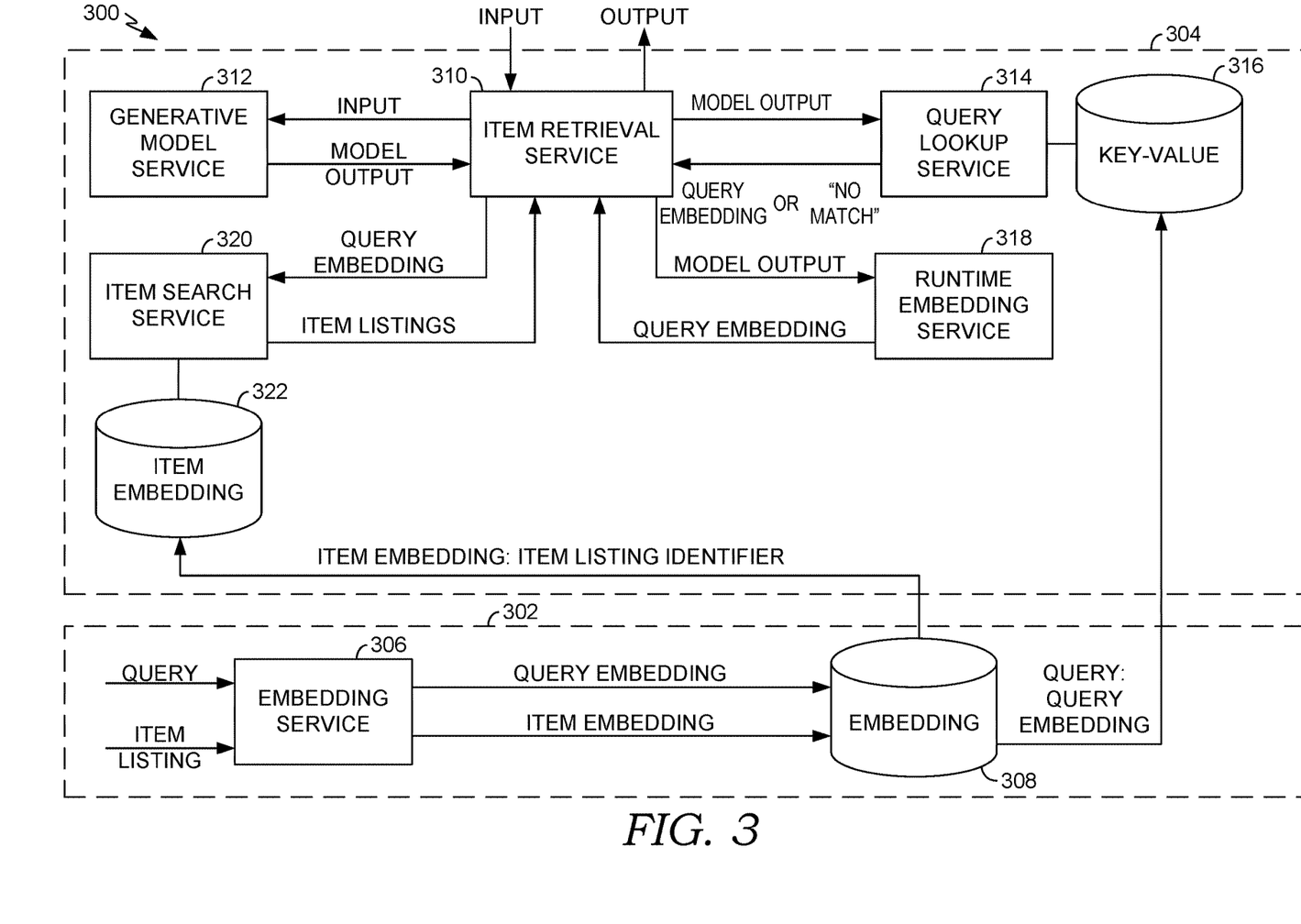
FIG. 3 is a block diagram showing another example process for performing item retrieval for a listing platform using model output from a generative model in accordance with some implementations of the present disclosure.

Turning next to FIG. 3, a block diagram is provided that shows another process 300 for performing item retrieval using a generative model in accordance with one aspect of the present technology. Similar to the process 200, the process 300 includes both an offline flow 302 and a runtime flow 304. In contrast to the process 200, the runtime flow 304 uses a runtime embedding service 318 to generate a query embedding from a model output instead of performing a known query search in the event that no match for the model output is found in a key-value store 316.

As shown in FIG. 3, the offline flow 302 includes an embedding service 306 generating query embeddings and item embeddings, which are stored in an offline embedding data store 308. The queries from which the query embeddings are generated can comprise, for instance, historical queries from a query log and/or previous model output. The item embeddings are generated for item listings on a listing platform. Queries with corresponding query embeddings are stored in a key-value store 316 as key-value pairs. Additionally, item embeddings are stored in association with item listing identifiers in an item embedding data store 322.

At runtime 304, an initial input, such as a user query in the case of search or a seed item in the case of recommendation, is received at an item retrieval service 310. The item retrieval service 310 can be provided, for instance, by the item retrieval system 106 of FIG. 1. In accordance with the example of FIG. 3, the item retrieval service 310 coordinates the runtime process of a number of services to perform item retrieval.

The item retrieval service 310 provides the input to a generative model service 312, which can correspond to the generative model component 112 of FIG. 1. The generative model service 312 employs a generative model to generate text based on the input to produce a model output. In some cases, this includes generating a prompt with the input and providing the prompt to the generative model. The model output is returned to the item retrieval service 310, which provides the model output to a query lookup service 314, which can correspond to the query lookup component 114 of FIG. 1. The query lookup service 314 determines whether a matching query is present in the key-value store 316. If a matching query is found in the key-value store 316, a query embedding stored in association with the matching query is returned to the item retrieval service 310.

If a matching query is not found in the key-value store 316, a no-match indication is returned to the item retrieval service 310, and the item retrieval service 310 then provides the model output to a runtime embedding service 318, which can correspond to the embedding component 118 of FIG. 1. The runtime embedding service 318 comprises an embedding model that generates a query embedding using the model output and returns the query embedding to the item retrieval service 310. In some cases, the model output and query embedding are also added as a key-value pair to the key-value store 316.

The item retrieval service 310 provides the query embedding returned by the query lookup service 314 (in the case of a match in the key-value store 316) or the query embedding generated by the runtime embedding service 318 (in the case of no match in the key-value store 316) to an item search service 320, which can correspond to the item search component 120 of FIG. 1. The item search service 320 searches the item embedding store 322 to identify item embeddings similar to the query embedding, for instance, using vector search techniques. An indication of item listings (e.g., using item listing identifiers) corresponding to identifying item embeddings is returned to the item retrieval service 310. The item retrieval service 310 provides an output identifying the item listings. In the case of search, the output can be used to provide search results. In the case of recommendation, the output can be used to provide item listing recommendations.

While FIGS. 2 and 3 discusses using a single query embedding to identify item embeddings, it should be understood that any number of query embeddings can be used. For instance, the model output could identify multiple global items and a query embedding could be obtained for each global item. As another example, the query search service 218 of FIG. 2 could identifying a number of known queries for a model output, and a query embedding could be obtained for each of those known queries.

Example Methods for Item Retrieval Using Generative Model Output

Figure 4:
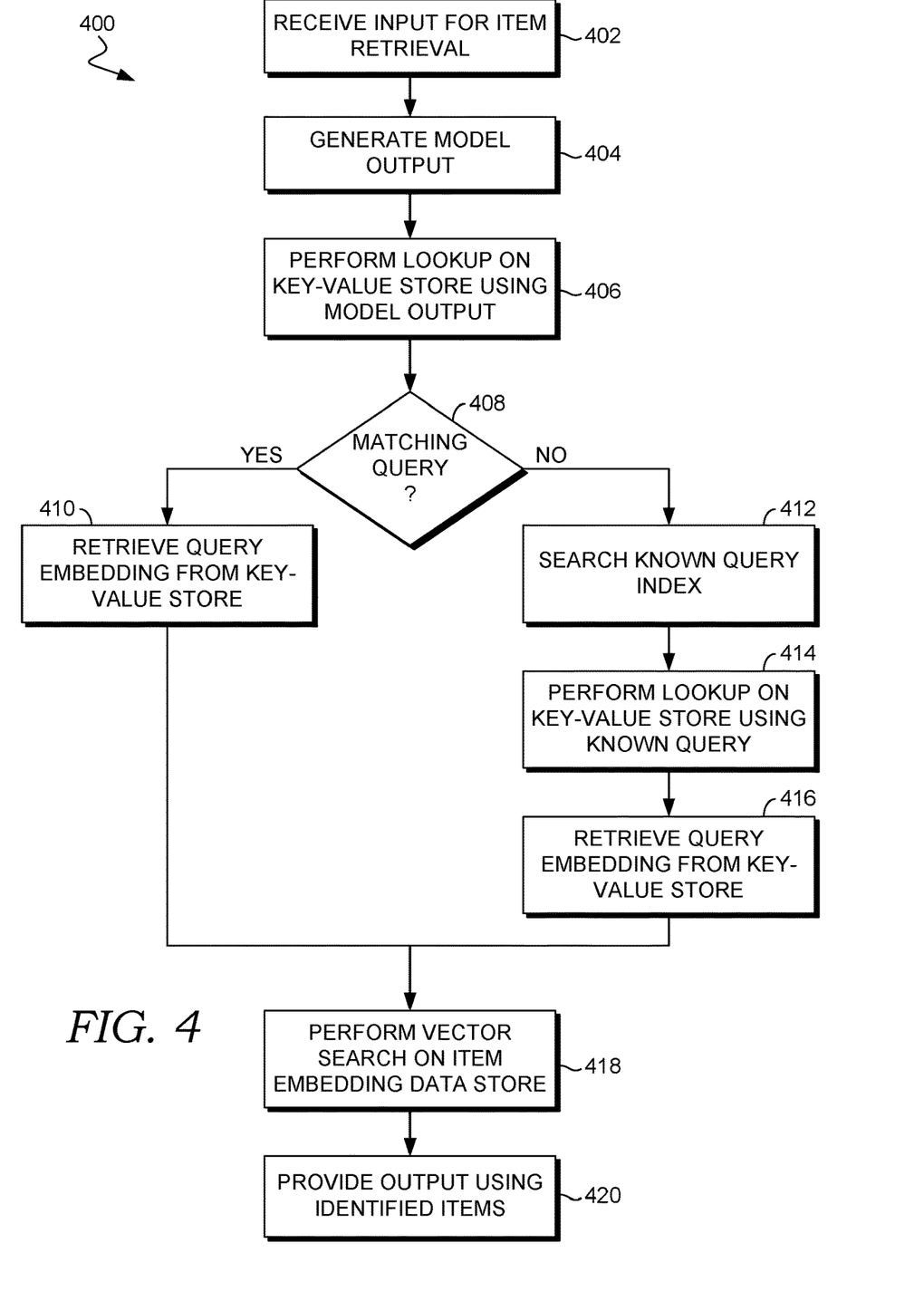
FIG. 4 is a flow diagram showing a method for performing item retrieval for a listing platform using model output from a generative model in accordance with some implementations of the present disclosure.

With reference now to FIG. 4, a flow diagram is provided that illustrates a method 400 for performing item retrieval using a generative model. The method 400 may be performed, for instance, by the item retrieval system 106 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, an input for item retrieval is received. The input can comprise, for instance, a user query in the case of search or a seed item in the case of recommendation. The user query can comprise, for instance, a text-based query or a voice-based query. The input is provided to a generative model, which generates text to provide a model output, as shown at block 404. In some aspects, the process can include generating a prompt using the initial input received at block 402 and providing the prompt to the generative model. The prompt can be generated based on the type of item retrieval task. For instance, one type of prompt may be employed for search-based item retrieval, while another type of prompt may be employed for recommendation-based item retrieval.

A lookup is performed on a key-value store using the model output, as shown at block 406. The key-value store stores known queries as keys with a corresponding query embedding stored as a value with each known query. The lookup determines whether there is a known query that matches the model output (i.e., a matching query). Accordingly, a determination is made at block 408 regarding whether there is a matching query for the model output in the key-value store. If there is a matching query, the query embedding stored in the key-value store in association with the matching query is retrieved, as shown at block 410. In some instances, multiple matching queries can be identified based on the model output, and the query embedding for each of those matching queries can be returned. For instance, the model output could identify multiple global items, and a matching query could be identified for each global item identified in the model output.

Alternatively, if there is no matching query, a search is performed on a known query index using the model output, as shown at block 412. The known query index is a data store that indexes known queries in a manner that allows for identifying known queries that are relevant to, although not exact matches to, model output. For instance, a fuzzy search could be performed using the model output as input to identify one or more known queries that are similar to the model output. A lookup is performed on the key-value store using a known query identified from searching the known query index, as shown at block 414. The lookup identifies the query in the key-value store matching the known query. The query embedding stored in the key-value store in association with that matching query is retrieved, as shown at block 416. In some cases, the search performed at block 412 returns multiple known queries, and a lookup is performed to retrieve the query embedding for each of those known queries.

Although not shown in FIG. 4, in some embodiments, query embeddings can be returned from both a matching query for model output identified in the key-value store and a known query identified from a known query index using the model output. For instance, the model output could identify a number of global items. A matching query in the key-value store could be identified for one or more of those global items from the model output, and a query embedding could be identified for each of those matching queries. Additionally, a matching query may not be identified for one or more other global items in the model output, and known queries could be identified from the known query index for those other global items and used to retrieve additional query embeddings from the key-value store.

As shown at block 418, a vector search is performed on an item embedding data store using the query embedding(s) obtained at block 410 and/or block 416. In some aspects, the vector search identifies one or more item embeddings based on a similarity of the item embeddings with the query embedding(s). Any of a variety of vector search techniques, such as cosine similarity and k-nearest neighbors, can be used to identify the one or more item embeddings. In some cases, a similarity measure is determined for each of a number of item embeddings, and the one or more item embeddings are selected based on their corresponding similarity measures.

An output responsive to the initial input received at block 402 is provided, as shown at block 420. The output is based on the item listings corresponding to the one or more item embeddings identified at block 418. For instance, in the case of the initial input being a user query, the output can comprise one or more search results identifying one or more item listings corresponding to the one or more item embeddings. In the case of the initial input being a seed item for recommendation, the output can comprise one or more recommendations identifying one or more item listings corresponding to the one or more item embeddings. The item listing(s) identified in the output can be determined, for instance, based on an item listing identifier stored in the item embedding store in association with each item embedding returned from the search performed at block 418.

Figure 5:
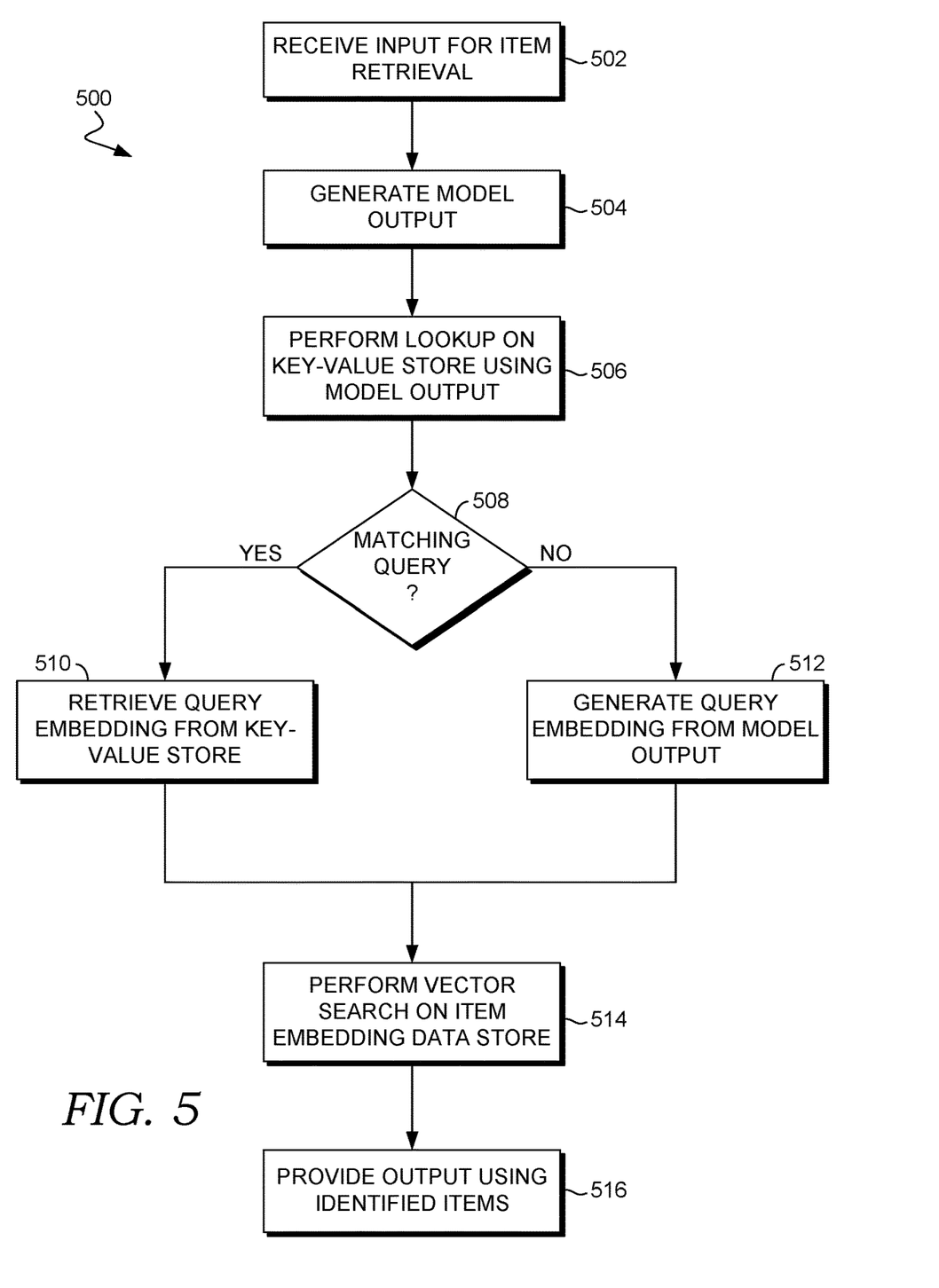
FIG. 5 is a flow diagram showing another method for performing item retrieval for a listing platform using model output from a generative model in accordance with some implementations of the present disclosure.

Turning next to FIG. 5, a flow diagram is provided that illustrates another method 500 for performing item retrieval using a generative model. The method 500 may be performed, for instance, by the item retrieval system 106 of FIG. 1. As shown at block 502, an input for item retrieval is received. The input can comprise, for instance, a user query in the case of search or a seed item in the case of recommendation. The user query can comprise, for instance, a text-based query or a voice-based query. The input is provided to a generative model, which generates text to provide a model output, as shown at block 504. In some aspects, the process can include generating a prompt using the initial input received at block 502 and providing the prompt to the generative model. The prompt can be generated based on the type of item retrieval task. For instance, one type of prompt may be employed for search-based item retrieval, while another type of prompt may be employed for recommendation-based item retrieval.

A lookup is performed on a key-value store using the model output, as shown at block 506. The key-value store stores known queries as keys with a corresponding query embedding stored as a value with each known query. The lookup determines whether there is a known query that matches the model output (i.e., a matching query). Accordingly, a determination is made at block 508 regarding whether there is a matching query for the model output in the key-value store. If there is a matching query, the query embedding stored in the key-value store in association with the matching query is retrieved, as shown at block 510. In some instances, multiple matching queries can be identified based on the model output, and the query embedding for each of those matching queries can be returned. For instance, the model output could identify multiple global items, and a matching query could be identified for each global item identified in the model output.

Alternatively, if there is no matching query, a query embedding is generated from the model output, as shown at block 512. For instance, the model output can be provided to an embedding model, which generates a query embedding based on the model output. In some instances, multiple query embeddings can be generated for the model output. For instance, the model output could identify multiple global items, and a query embedding could be generated for each global item identified in the model output.

Although not shown in FIG. 5, in some embodiments, query embeddings can be returned from both a matching query for model output identified in the key-value store and a query embedding generated by an embedding model from the model output. For instance, the model output could identify a number of global items. A matching query in the key-value store could be identified for one or more of those global items from the model output, and a query embedding could be identified for each of those matching queries. Additionally, a matching query may not be identified for one or more other global items in the model output, and a query embedding could be generated by the embedding model for each of those other global items.

As shown at block 514, a vector search is performed on an item embedding data store using the query embedding(s) obtained at block 510 and/or block 512. In some aspects, the vector search identifies one or more item embeddings based on a similarity of the item embeddings with the query embedding(s). Any of a variety of vector search techniques, such as cosine similarity and k-nearest neighbors, can be used to identify the one or more item embeddings. In some cases, a similarity measure is determined for each of a number of item embeddings, and the one or more item embeddings are selected based on their corresponding similarity measures.

An output responsive to the initial input received at block 502 is provided, as shown at block 516. The output is based on the item listings corresponding to the one or more item embeddings identified at block 514. For instance, in the case of the initial input being a user query, the output can comprise one or more search results identifying one or more item listings corresponding to the one or more item embeddings. In the case of the initial input being a seed item for recommendation, the output can comprise one or more recommendations identifying one or more item listings corresponding to the one or more item embeddings. The item listing(s) identified in the output can be determined, for instance, based on an item listing identifier stored in the item embedding store in association with each item embedding returned from the search performed at block 514.

Exemplary Operating Environment

Figure 6:
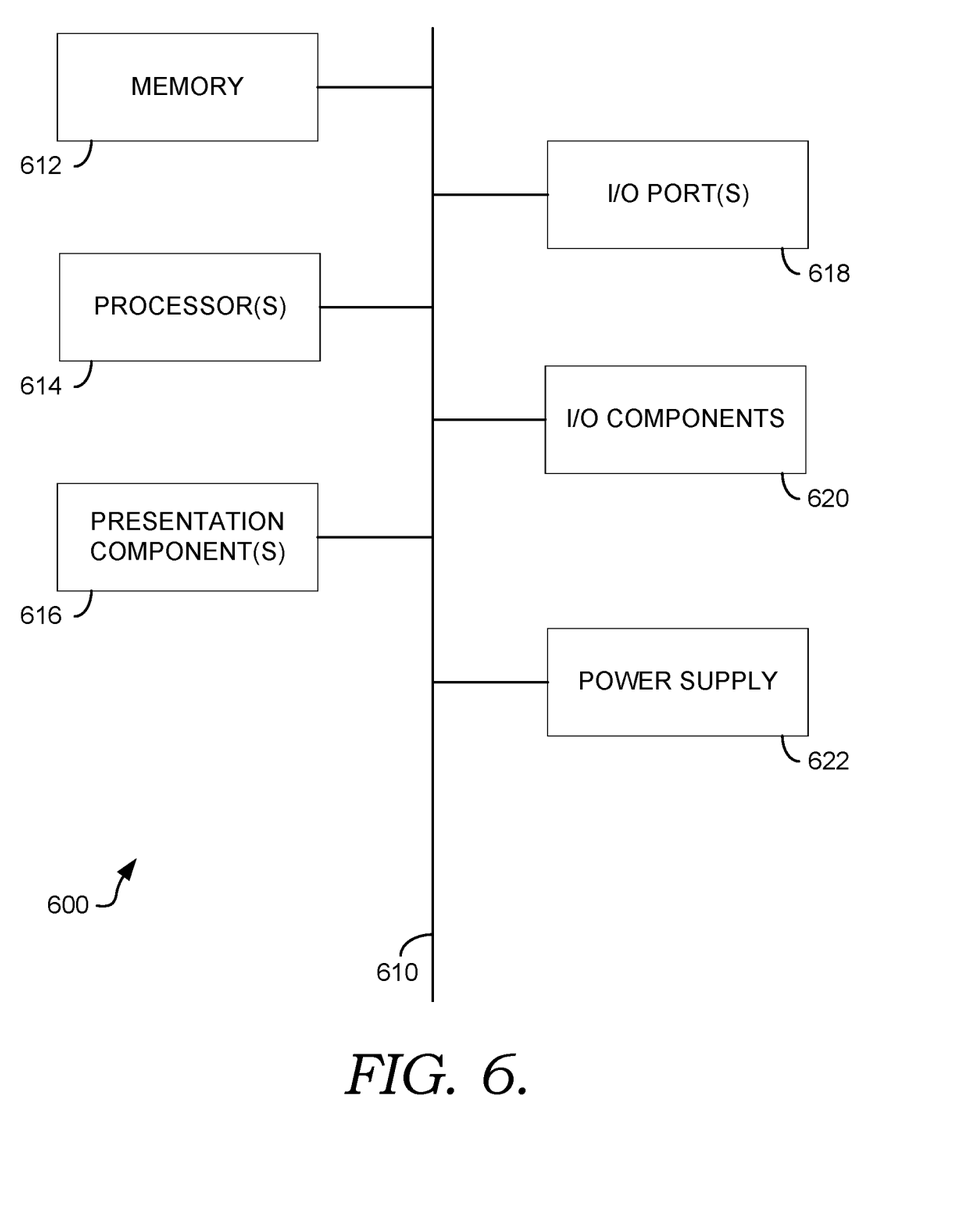
FIG. 6 is a block diagram of an exemplary computing environment suitable for use in implementations of the present disclosure.

Having described implementations of the present disclosure, an exemplary operating environment in which embodiments of the present technology may be implemented is described below in order to provide a general context for various aspects of the present disclosure. Referring initially to FIG. 6 in particular, an exemplary operating environment for implementing embodiments of the present technology is shown and designated generally as computing device 600. Computing device 600 is but one example of a suitable computing environment and is not intended to suggest any limitation as to the scope of use or functionality of the technology. Neither should the computing device 600 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present technology. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations, the operations comprising:
 receiving an input for item retrieval on a listing platform;
 causing a generative model to generate text using the input to provide a model output;
 retrieving, from a key-value store, a query embedding for the model output, wherein the key-value store comprises a plurality of queries as keys and a plurality of query embeddings as corresponding values for the plurality of queries, the plurality of query embeddings generated offline using an embedding model and stored in the key-value store to make the plurality of query embeddings available at runtime for item retrieval on the listing platform, and wherein the query embedding for the model output is retrieved by:
  performing a lookup on the key-value store using the model output,
  in response to a matching query for the model output being found in the key-value store, retrieving a first query embedding stored in the key-value store in association with the matching query, wherein the first query embedding is provided as the query embedding for the model output, and in response to a matching query for the model output being absent in the key-value store, performing a search on a known query index using the model output to identify a known query and retrieving a second query embedding stored in the key-value store in association with the known query, wherein the second query is provided as the query embedding for the model output;

identifying one or more item embeddings based on similarity to the query embedding for the model output; and providing an output identifying one or more item listings corresponding to the one or more item embeddings.

2. The one or more computer storage media of claim 1, wherein the input for item retrieval comprises a user query from the user device, and wherein the output comprises one or more search results identifying the one or more item listings.

3. The one or more computer storage media of claim 1, wherein the input for item retrieval comprises a seed item, and wherein the output comprises one or more recommendations identifying the one or more item listings.

4. The one or more computer storage media of claim 1, wherein causing the generative model to generate the text to provide the model output comprises:
generating a prompt using the input for item retrieval; and
providing the prompt as input to the generative model.

5. The one or more computer storage media of claim 4, wherein the prompt instructs the generative model to generate a text string identifying one or more global items.

6. The one or more computer storage media of claim 1, wherein the key-value store and the known query index store a plurality of known queries, and wherein at least a portion of the plurality of known queries comprise historical queries from a query log for the listing platform.

7. The one or more computer storage media of claim 1, wherein the key-value store and the known query index store a plurality of known queries, and wherein at least a portion of the plurality of known queries comprise model output previously generated by the generative model using previous input for item retrieval.

8. The one or more computer storage media of claim 1, wherein when a matching query for the model output is not found in the key-value store, the operations further comprise:
causing the embedding model to generate a new query embedding for the model output; and
storing the new query embedding in association with the model output in the key-value store.

9. The one or more computer storage media of claim 8, wherein the operations further comprise:
storing the model output as a known query in the known query index.

10. A computer-implemented method comprising:
receiving an input for item retrieval on a listing platform;
causing a generative model to generate text using the input to provide a model output;
obtaining a query embedding for the model output by:
performing a lookup on a key-value store using the model output, wherein the key-value store comprises a plurality of queries as keys and a plurality of query embeddings as corresponding values for the plurality of queries, the plurality of query embeddings generated offline using an embedding model and stored in the key-value store to make the plurality of query embeddings available at runtime for item retrieval on the listing platform, in response to a matching query for the model output being found in the key-value store, retrieving a query embedding stored in the key-value store in association with the matching query and using the query embedding retrieved from the key value store as the query embedding for the model output, and in response to a matching query for the model output being absent in the key-value store, causing the embedding model to generate a new query embedding and using the new query embedding as the query embedding for the model output;

identifying one or more item embeddings based on similarity to the query embedding for the model output; and providing an output identifying one or more item listings corresponding to the one or more item embeddings.

11. The computer-implemented method of claim 10, wherein the input for item retrieval comprises a user query from the user device, and wherein the output comprises one or more search results identifying the one or more item listings.

12. The computer-implemented method of claim 10, wherein the input for item retrieval comprises a seed item, and wherein the output comprises one or more recommendations identifying the one or more item listings.

13. The computer-implemented method of claim 10, wherein causing the generative model to generate the text to provide the model output comprises:
generating a prompt using the input for item retrieval; and
providing the prompt as input to the generative model.

14. The computer-implemented method of claim 10, wherein the key-value store stores a plurality of known queries, and wherein at least a portion of the plurality of known queries comprise historical queries from a query log for the listing platform.

15. The computer-implemented method of claim 10, wherein the key-value store stores a plurality of known queries, and wherein at least a portion of the plurality of known queries comprise model output previously generated by the generative model using previous input for item retrieval.

16. The computer-implemented method of claim 10, wherein when a matching query for the model output is not found in the key-value store, the operations further comprise:
storing the new query embedding in association with the model output in the key-value store.

17. A computer system comprising:
one or more processors; and
one or more computer storage media storing computer-useable instructions that, when used by the one or more processors, causes the computer system to perform operations comprising:
receiving an input for item retrieval on a listing platform;
causing a generative model to generate text using the input to provide a model output;
identifying, from a key-value store, a first query embedding corresponding to a first known query in the key-value store matching a first portion of the model output, wherein the key-value store comprises a plurality of queries as keys and a plurality of query embeddings as corresponding values for the plurality of queries, the plurality of query embeddings generated offline using an embedding model and stored in the key-value store to make the plurality of query embeddings available at runtime for item retrieval on the listing platform;

obtaining a second query embedding based on a second portion of the model output;

identifying one or more item embeddings based on the first query embedding and/or the second query embedding; and providing an output identifying one or more item listings corresponding to the one or more item embeddings.

18. The computer system of claim 17, wherein the first portion of the model output identifies a first item and the second portion of the model output identifies a second item.

19. The computer system of claim 17, wherein obtaining the second query embedding comprises:

determining, from a known query index, a second known query based on relevance to the second portion of the model output; and identifying, from the key-value store, the second query embedding corresponding to the second known query.

20. The computer system of claim 17, wherein obtaining the second query embedding comprises:

causing the embedding model to generate the second query embedding using the second portion of the model output.

* * * * *